US012579830B2

(12) United States Patent
Li et al.

(10) Patent No.: US 12,579,830 B2
(45) Date of Patent: Mar. 17, 2026

(54) COMBINING BRIGHTFIELD AND FLUORESCENT CHANNELS FOR CELL IMAGE SEGMENTATION AND MORPHOLOGICAL ANALYSIS IN IMAGES OBTAINED FROM AN IMAGING FLOW CYTOMETER

(71) Applicant: Cytek Biosciences, Inc., Fremont, CA (US)

(72) Inventors: Alan Li, Kirkland, WA (US); Shobana Vaidyanathan, Redmond, WA (US)

(73) Assignee: Cytek Biosciences, Inc., Fremont, CA (US)

( * ) Notice: Subject to any disclaimer, the term of this patent is extended or adjusted under 35 U.S.C. 154(b) by 0 days.

(21) Appl. No.: 18/647,366

(22) Filed: Apr. 26, 2024

(65) Prior Publication Data

US 2025/0029408 A1     Jan. 23, 2025

Related U.S. Application Data

(63) Continuation of application No. 17/076,008, filed on Oct. 21, 2020, now Pat. No. 11,972,620, which is a
(Continued)

(51) Int. Cl.
*G06V 20/69*        (2022.01)
*G01N 15/1433*      (2024.01)
(Continued)

(52) U.S. Cl.
CPC ....... *G06V 20/698* (2022.01); *G01N 15/1433* (2024.01); *G06T 7/0012* (2013.01);
(Continued)

(58) Field of Classification Search
CPC .............. G06V 20/698; G06V 20/695; G06V 2201/03; G01N 15/1433; G06T 7/0012;
(Continued)

(56) References Cited

U.S. PATENT DOCUMENTS

| | | | |
|---|---|---|---|
| 2014/0030729 A1* | 1/2014 | Basiji | G01N 33/5091 |
| | | | 435/6.14 |
| 2017/0052106 A1* | 2/2017 | Hennig | G06V 20/698 |
| 2018/0082153 A1* | 3/2018 | Wan | G06T 7/0014 |

\* cited by examiner

*Primary Examiner* — Stephen R Koziol
*Assistant Examiner* — Michael Kim Maiden
(74) *Attorney, Agent, or Firm* — Alford Law Group, Inc.

(57)                    ABSTRACT

A classifier engine provides cell morphology identification and cell classification in computer-automated systems, methods and diagnostic tools. The classifier engine performs multispectral segmentation of thousands of cellular images acquired by a multispectral imaging flow cytometer. As a function of imaging mode, different ones of the images provide different segmentation masks for cells and subcellular parts. Using the segmentation masks, the classifier engine iteratively optimizes model fitting of different cellular parts. The resulting improved image data has increased accuracy of location of cell parts in an image and enables detection of complex cell morphologies in the image. The classifier engine provides automated ranking and selection of most discriminative shape based features for classifying cell types.

4 Claims, 13 Drawing Sheets

Related U.S. Application Data continuation of application No. 16/097,568, filed as application No. PCT/US2017/035922 on Jun. 5, 2017, now Pat. No. 10,846,509.

(60) Provisional application No. 62/348,356, filed on Jun. 10, 2016.

(51) Int. Cl.
  *G06T 7/00*           (2017.01)
  *G06T 7/11*           (2017.01)

(52) U.S. Cl.
  CPC .............. *G06T 7/11* (2017.01); *G06V 20/693* (2022.01); *G06V 20/695* (2022.01); *G06T 2207/10064* (2013.01); *G06T 2207/30024* (2013.01); *G06V 2201/03* (2022.01)

(58) Field of Classification Search
  CPC ............. G06T 7/11; G06T 2207/30024; G06T 2207/10064
  See application file for complete search history.

COMBINING BRIGHTFIELD AND FLUORESCENT CHANNELS FOR CELL IMAGE SEGMENTATION AND MORPHOLOGICAL ANALYSIS IN IMAGES OBTAINED FROM AN IMAGING FLOW CYTOMETER

RELATED APPLICATIONS

This patent application is a continuation and claims the benefit of U.S. patent application Ser. No. 17/076,008, titled METHOD TO COMBINE BRIGHTFIELD AND FLUORESCENT CHANNELS FOR CELL IMAGE SEGMENTATION AND MORPHOLOGICAL ANALYSIS USING IMAGES OBTAINED FROM IMAGING FLOW CYTOMETER (IFC) filed by Alan Li et al. on Oct. 21, 2020, now allowed. U.S. patent application Ser. No. 17/076,008 is a continuation and claims the benefit of U.S. patent application Ser. No. 16/097,568, titled METHOD TO COMBINE BRIGHTFIELD AND FLUORESCENT CHANNELS FOR CELL IMAGE SEGMENTATION AND MORPHOLOGICAL ANALYSIS USING IMAGES OBTAINED FROM IMAGING FLOW CYTOMETER (IFC) filed by Alan Li et al. on Oct. 29, 2018, now issued as U.S. Pat. No. 10,846,509. U.S. patent application Ser. No. 16/097,568 is a national phase application claiming the benefit of International Patent App. No. PCT/US2017/035922, titled METHOD TO COMBINE BRIGHTFIELD AND FLUORESCENT CHANNELS FOR CELL IMAGE SEGMENTATION AND MORPHOLOGICAL ANALYSIS USING IMAGES OBTAINED FROM IMAGING FLOW CYTOMETER (IFC) filed by Alan Li et al. on Jun. 5, 2017. International Patent App. No. PCT/US2017/035922 claims the benefit of U.S. Provisional Application No. 62/348,356, titled METHOD TO COMBINE BRIGHTFIELD AND FLUORESCENT CHANNELS FOR CELL IMAGE SEGMENTATION AND MORPHOLOGICAL ANALYSIS USING IMAGES OBTAINED FROM IMAGING FLOW CYTOMETER (IFC) filed by Alan Li et al. on Jun. 10, 2016. The entire teachings of the above application(s) are incorporated herein by reference for all intents and purposes.

BACKGROUND

Cytometry is the measurement of the characteristics of cells including cell size, cell count, cell morphology (shape and structure), cell cycle phase, DNA content, and the existence or absence of specific proteins on the cell surface or in the cytoplasm. Cytometry is used to characterize and count blood cells in common blood tests. In a similar fashion, cytometry is also used in cell biology research and in medical diagnostics to characterize cells in a wide range of applications associated with diseases such as cancer and other disorders.

Cytometric devices include image cytometers which operate by statically imaging a large number of cells using optical microscopy. Prior to analysis, cells may be stained to enhance contrast or to detect specific molecules by labeling these with fluorochromes. The cells may be viewed within a hemocytometer to aid manual counting. The introduction of the digital camera has led to the automation of image cytometers including automated image cytometers for cell counting and automated image cytometers for sophisticated high-content screening systems.

Another cytometric device is the flow cytometer. In a flow cytometer, cells are suspended in a stream of fluid and passed by an electronic detection apparatus. The cells are characterized optically or by the use of an electrical impedance method called the Coulter principle. To detect specific molecules when optically characterized, cells are in most cases stained with the same type of fluorochromes that are used by image cytometers. Flow cytometers generally provide less data than image cytometers but have a significantly higher throughput.

For example, in biotechnology, flow cytometry is a laser- or impedance-based, biophysical technology and is employed in cell counting, cell sorting, biomarker detection and protein engineering. The flow cytometer allows simultaneous multiparametric analysis of the physical and chemical characteristics of up to thousands of particles (cells) per second. Flow cytometry is routinely used in the diagnosis of health disorders, especially blood cancers. However, flow cytometry has other applications in research, clinical practice, and clinical trials. A common variation is to physically sort cell particles based on their properties, so as to purify cell populations of interest.

Assessment of morphology is critical for identification of different cell types. It also plays a vital role in evaluating the health of the cell. However, accurately classifying complex morphologies such as sickle cells, diatoms, and spermatozoa can be a challenge due to the heterogeneous shapes within a cell.

Current methodology involves (i) obtaining images from a microscope, (ii) then manually locating the subcellular components, and (iii) estimating the coordinates for spatial location of that cellular component and subcomponents in order to approximately map them back to a brightfield image.

SUMMARY OF THE INVENTION

With the present invention, Applicant addresses the shortcomings and challenges of the art. In particular, embodiments provide a computer implemented cell morphology classification system or tool. Embodiments employ a multispectral imaging flow cytometer to acquire a variety of images in different imaging modes, such as brightfield, side scatter, and fluorescent images, of a subject cell. The images are simultaneously acquired and spatially well aligned across the imaging modes. The acquired images are fed to a processor-based classifier engine (i.e., a classifier) that automatically analyzes thousands of cellular images and accurately identifies different cellular and subcellular components. Specifically, the classifier engine performs multispectral segmentation using segmentation masks for cells and subcellular parts. The classifier engine performs the multispectral segmentation by iteratively optimizing model fitting of different cellular parts. By using the segmentation masks, the classifier engine extracts advanced shape features such as contour curvature and bending score, and in turn detects complex morphologies such as fragmented or detached cells, stretched or pointed cell boundary, etc. Next, the classifier engine provides automated ranking and selection of most discriminative shape based features for classifying test (sample) cells into subpopulations.

One embodiment has demonstrated the efficacy of Applicant's approach on boar semen samples by accurately classifying various sperm morphology defects. Other embodiments may classify cancer cells, sickle cells and other cell types with complex morphologies. Yet other embodiments provide a diagnostic tool for identifying cell morphology and/or classifying different cell types.

Embodiments provide a computer-automated cell classification system comprising: an imaging flow cytometer, a classifier engine, and an output unit. The imaging flow cytometer acquires a multispectral plurality of images of a sample cell. The plurality of images is simultaneously acquired across multiple imaging modes, and each of the images of the plurality is spatially well aligned with each other.

The classifier engine is executed by a computer processor and coupled to receive the acquired multispectral plurality of images by the image flow cytometer. The classifier engine:

(A) segments one of the images of the acquired plurality into components, the one image providing morphology of the sample cell, and the components being formed of image subcomponents representing parts of the sample cell;

(B) improves accuracy of location of cell parts in the one image by: (i) segmenting other images of the acquired plurality into components corresponding to components segmented from the one image, the other images being of different imaging modes than the one image and each other, and the components segmented from the other images serving as masks of image subcomponents of the one image, (ii) spatially correlating the subcomponent masks generated by the segmented other images to the one image, and using the subcomponent masks as foreground object markers of respective cell parts for the one image, and (iii) applying a graphic cut segmentation to the one image in a manner that generates improved image data of the one image having increased accuracy of location of cell parts; and (C) reprocesses the one image resulting from (B) and having the generated improved image data including component masks with relative positions, the reprocessing identifying cell morphology from the one image and thereby classifying cell type of the sample cell. The output unit renders indications of the identified cell morphology and/or cell type classification from the classifier engine. The output unit may be any of a computer display monitor, a diagnostic test indicator, or other digital rendering.

In embodiments, the cell classification system employs a brightfield image as the one image, and the other images are fluorescent images of different fluorescent channels. In such cell classification systems, the classifier engine step (B) of improving accuracy of location of cell parts in the brightfield image iteratively applies (i) through (iii) to each of the different fluorescent images.

In other embodiments of the cell classification system, the classifier engine classifies cell types including any one or more of: sperm cells having disorders, sickle cells, cancer cells, and other cells indicative of disease or health disorder. In some embodiments, the classifier engine may classify defective sperm cells, and the output unit is a diagnostic indicator rendering indication of infertility. The classifier engine may classify a defective sperm cell by automatically identifying one or more of: cytoplasmic droplets, occurrence of Distal Midpiece Reflex (DMR), and shape of sperm head.

Other embodiments provide a computer-based diagnostic tool for identifying cell morphology and classifying cell type. Such a diagnostic tool comprises an input assembly and a classifier engine communicatively coupled to the input assembly. The input assembly provides access to a source of plural multispectral images of a sample cell. The plural images are simultaneously acquired by an imaging flow cytometer, and the plural images are spatially well aligned amongst each other.

The classifier engine receives the plural multispectral images form the input assembly. The classifier engine is executed by a computer processor and processes the received images by:

(A) segmenting one of the received images into components, the one image providing morphology of the sample cell, and the components being formed of image subcomponents representing parts of the sample cell;

(B) improving accuracy of location of cell parts in the one image by: (i) segmenting other ones of the received images into components corresponding to components segmented from the one image, the other received images being of different imaging modes than the one image and each other, and the components segmented from the other received images serving as masks of image subcomponents of the one image, (ii) spatially correlating the subcomponent masks generated by the segmented other received images to the one image, and using the subcomponent masks as foreground object markers of respective cell parts for the one image, and (iii) applying a graphic cut segmentation to the one image in a manner that generates improved image data of the one image having increased accuracy of location of cell parts; and (C) reprocessing the one image resulting from (B) and having the generated improved image data including component masks with relative positions.

The reprocessing by the classifier engine identifies cell morphology from the one image and thereby classifies cell type of the sample cell. The classifier engine provides an output indication of the identified cell morphology and/or cell type classification. Such output indication serves as the diagnostic tools' indicator of infertility, defective sperm cells, or similar analytic outcome, and may be rendered, for non-limiting example, on a display screen.

Taking advantage of the ability of imaging flow cytometers to acquire images at high speed and resolution and using the analysis framework with specific statistical modeling, embodiments observed above 90 percent sensitivity and specificity in results. As such, embodiments demonstrate the ability to accurately extract salient morphological features, and classify cell types in an objective and precise manner.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
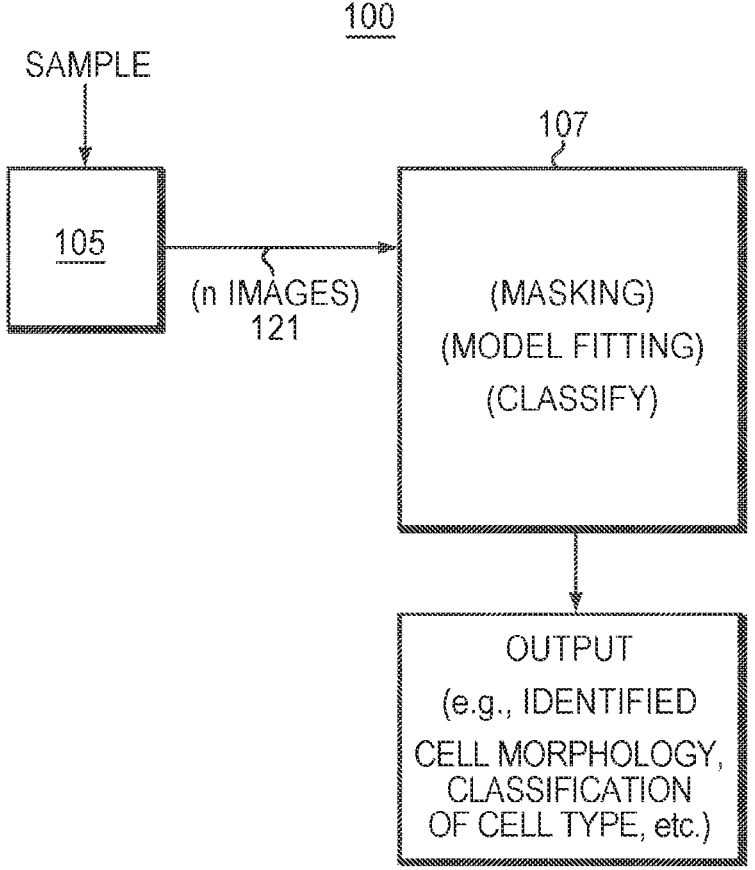
FIG. 1 is a block diagram of an embodiment of the present invention.

Illustrated in FIG. 1 is a cell classification system or computer-based tool 100 embodying the present invention. A biological sample of interest, such as bodily fluids or other material (medium) carrying subject cells is provided as input to a multispectral imaging flow cytometer 105. The imaging flow cytometer 105 combines the fluorescence sensitivity of standard flow cytometry with the spatial resolution and quantitative morphology of digital microscopy. An example imaging flow cytometer is the AMNIS IMAGESTREAM manufactured by Applicant. Other imaging flow cytometers are suitable.

Also imaging flow cytometer 105 is compatible with a broad range of cell staining protocols of conventional flow cytometry as well as with protocols for imaging cells on slides. See U.S. Pat. Nos. 6,211,955; 6,249,341; 7,522,758 and "Cellular Image Analysis and Imaging by Flow Cytometry" by David A. Basiji, et al. published in Clinical Laboratory Medicine 2007 September, Volume 27, Issue 3, pages 653-670 (herein incorporated by reference in their entirety).

Imaging flow cytometer 105 electronically tracks moving cells in the sample with a high resolution multispectral imaging system and simultaneously acquires multiple images of each target cell in different imaging modes. In one embodiment, the acquired images 121 of a cell include: a side-scatter (darkfield) image, a transmitted light (brightfield) image, and several fluorescence images of different spectral bands. Importantly, not only are the cellular images (i.e., images of a cell) 121 simultaneously acquired but are also spatially well aligned with each other across the different imaging modes. Thus, the acquired darkfield image, brightfield image and fluorescence images (collectively images 121) of a subject cell are spatially well aligned with each other enabling mapping of corresponding image locations to within about 1-2 pixels accuracy.

The acquired cellular images 121 are output from imaging flow cytometer 105 and input to computer-implemented classifier engine or modeler 107. For non-limiting example, embodiments may employ an input assembly for implementing streaming feed or other access to the acquired images 121. Classifier engine 107 is configured to automatically analyze thousands of cellular images 121 in near real time of image acquisition or access, and to accurately identify different cellular and subcellular components of the sample cells. That is, each image 121 has components representing cells in the sample, and a given component may be formed of one or more image subcomponents representing parts (portions) of a cell.

Briefly, from the acquired images 121, classifier engine 107 selects an image that illustrates the morphology of a cell, such as the brightfield image for non-limiting example. The classifier engine 107 segments the brightfield image into components (representative of candidate cells), and likewise segments the other images of the different spectral bands into corresponding cellular components. Where the acquired images 121 are spatially well aligned to each other, components resulting from the segmented images serve as accurate segmentation masks for cells and subcellular parts of the sample. The classifier engine 107 uses corresponding components and their subcomponents of the segmented images of the different spectral bands to iteratively optimize model fitting of different cellular parts of the brightfield image. As a result, classifier engine 107 extracts advanced shape features such as contour curvature and bending scope from the processed brightfield image and is thereby able to detect complex morphologies such as fragmented or detached cells, stretched or pointed cell boundary, etc. in the sample cells. On output, classifier engine 107 (and thus system/tool 100) provides indications of identified cell morphologies and/or classification of cell type. A computer display monitor or other output unit may be used to render these output indications (visually, audibly, using multimedia, etc.) to an end-user.

Figure 2:
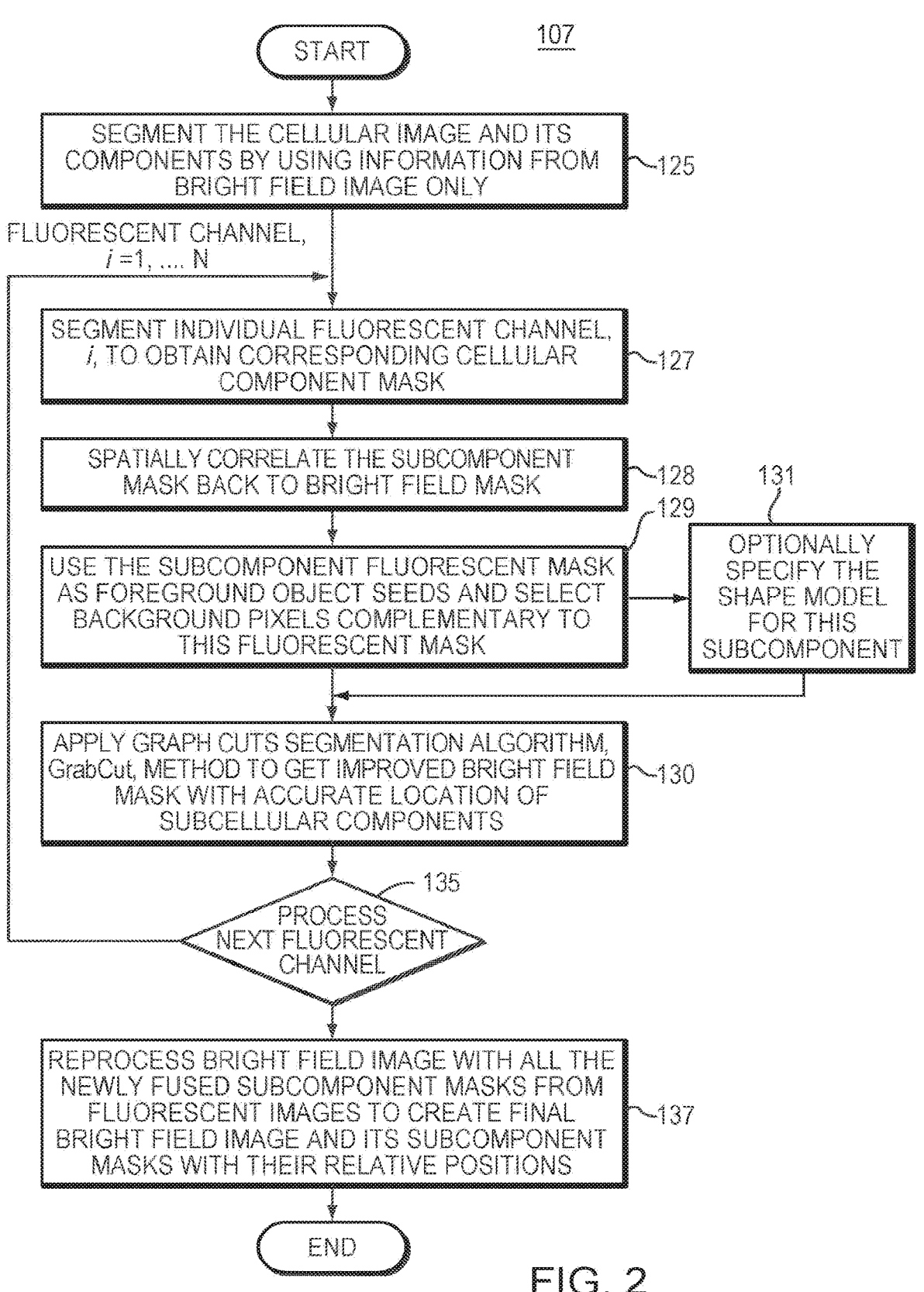
FIG. 2 is a flow diagram of the classifier engine of FIG. 1.
Figure 3A:
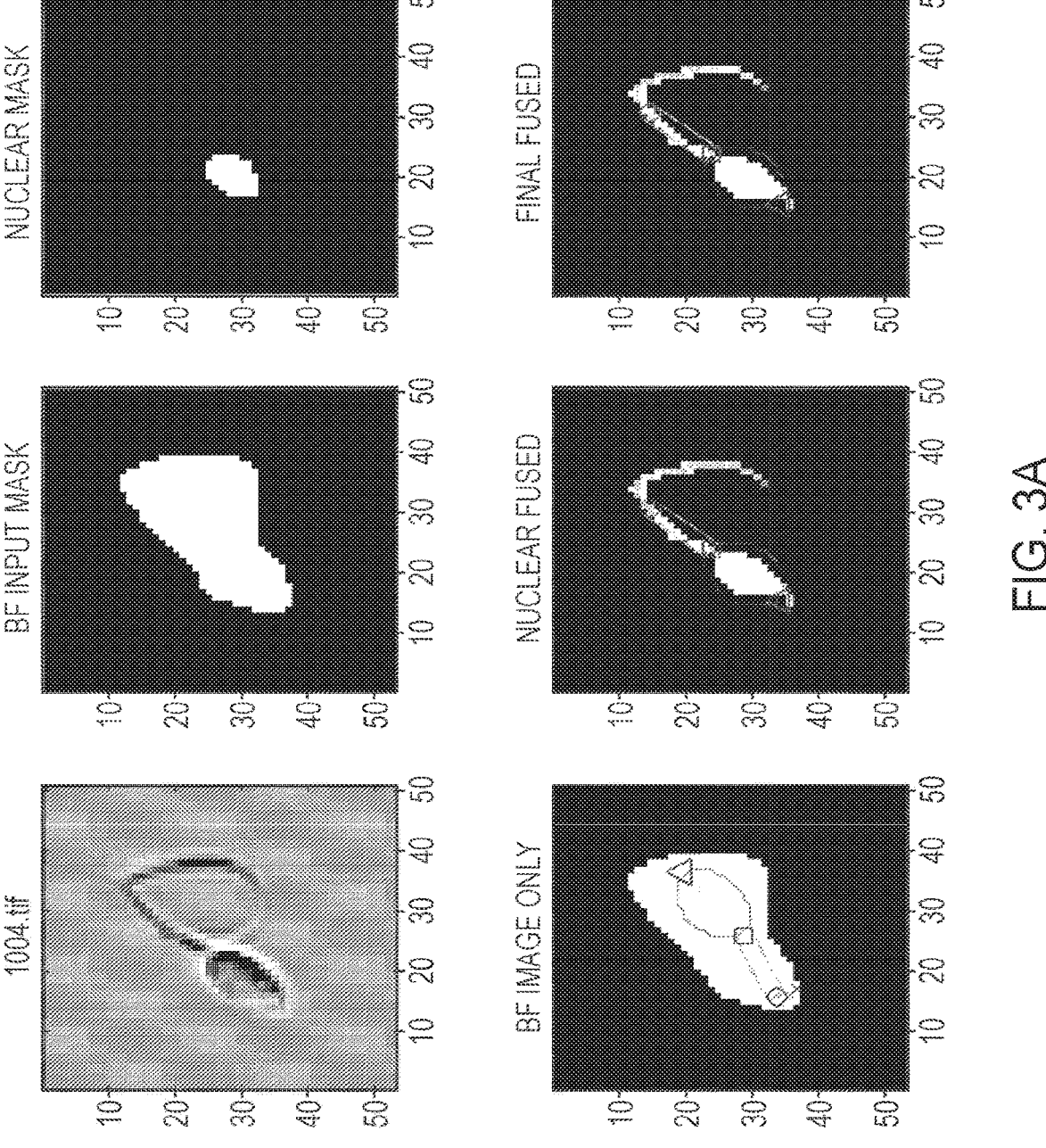
FIGS. 3A-3D illustrate masks employed by embodiments.
Figure 3B:
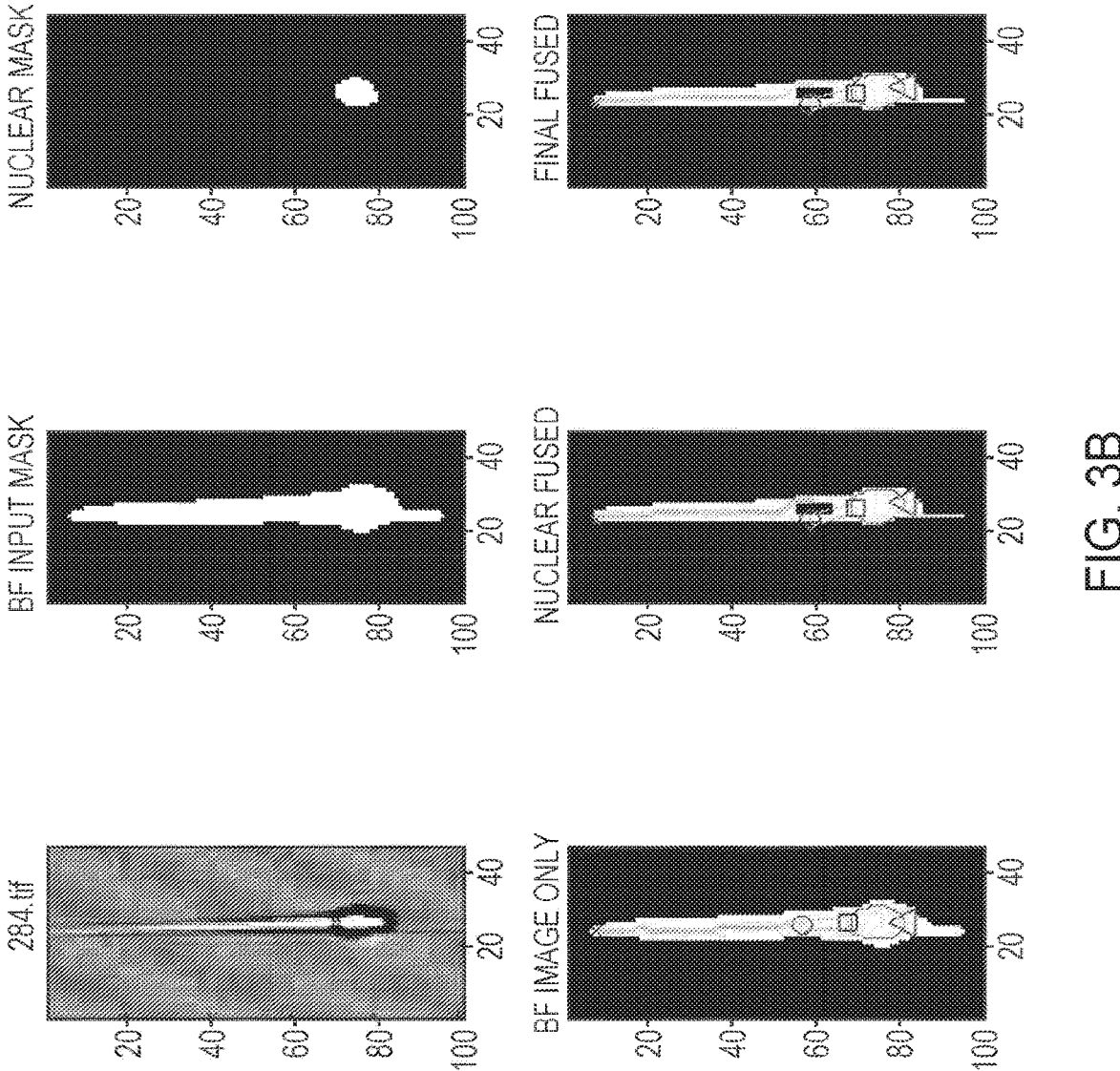
Figure 3C:
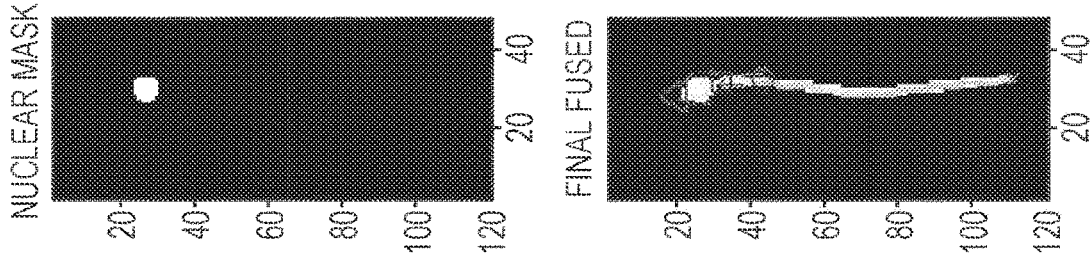
Figure 3C:
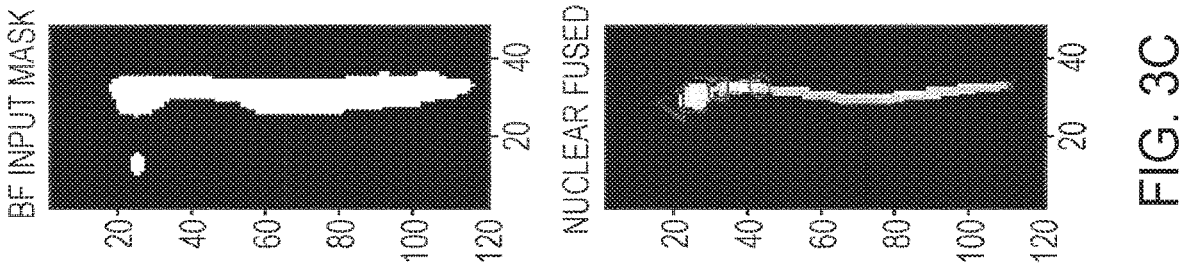
Figure 3C:
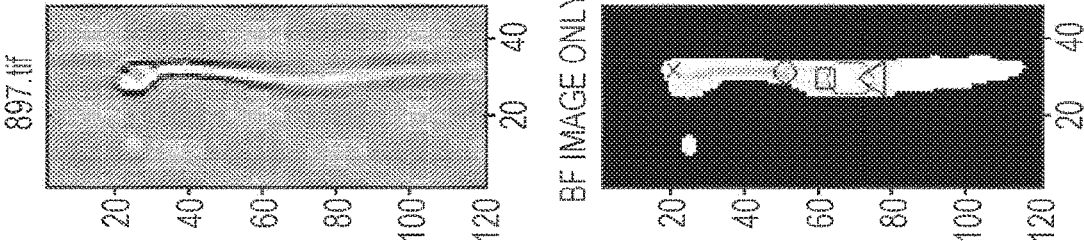
Figure 3D:
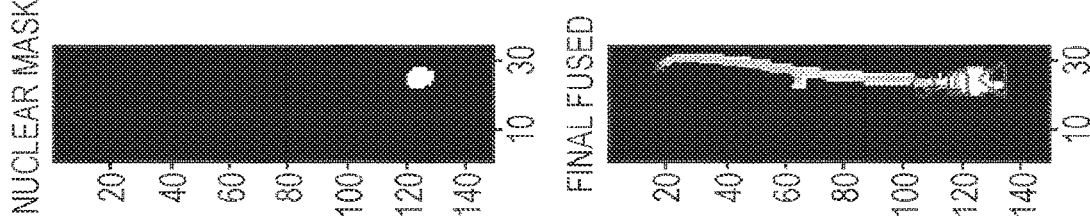
Figure 3D:
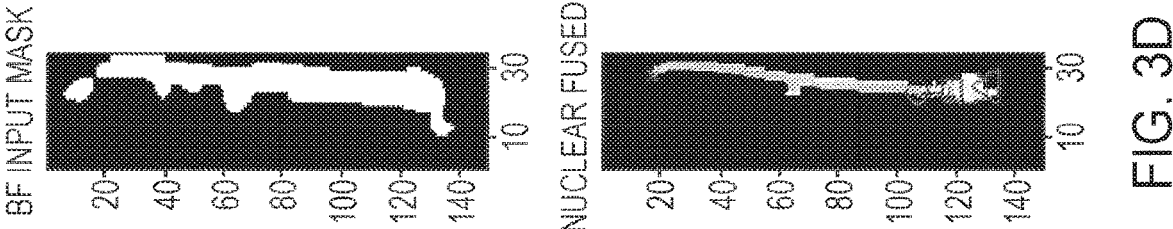
Figure 3D:
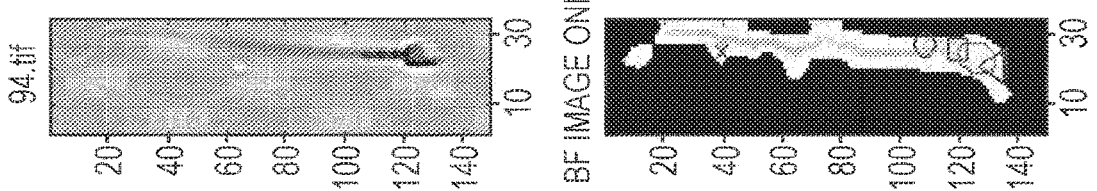

Turning now to FIG. 2, a flow diagram of data, logic, and/or control of one embodiment of classifier engine 107 is shown. Classifier engine 107 begins with the brightfield image or equivalent image bearing morphology of a cell in the acquired images 121. At step 125, classifier engine 107 segments the cellular image and its components by using information from the brightfield image only.

Next, classifier engine 107 iterates through steps 127-131 for each fluorescent channel image, i, of the acquired images 121. For a given fluorescent channel image, step 127 segments the fluorescent channel image to obtain a corresponding cellular image component (with subcomponents) mask. Step 128 spatially correlates the resulting subcomponent mask of step 127 back to the brightfield mask (the binary image data of the brightfield image of step 125) as shown in FIGS. 3A-3D with the label "BF Image Only". Step 129 uses the subcomponent mask (of step 127) as foreground object seeds and selects background pixels complementary to this fluorescent subcomponent mask. As an option, step 131 specifies the shape model for this subcomponent. Step 130 applies a graph cut segmentation algorithm, such as GrabCut known in the art, to arrive at an improved brightfield mask with accurate location of subcellular components (image subcomponents representing cell parts). Other graph cut segmentation methods may be employed.

Decision juncture 135 loops back to step 127 to process the next fluorescent channel image i. Steps 127-131 repeat for each fluorescent channel image of the acquired images 121. After the last of the fluorescent channel images has been processed, decision juncture 135 continues at step 137.

Step 137, reprocesses the brightfield image with all the newly fused subcomponent masks generated from the above processing of the fluorescent channel images. The reprocessing of step 137 uses a multi-label graph cuts algorithm (known in the art) and creates a final brightfield image and its subcomponent masks with their relative positions. FIGS. 3A-3D are illustrative where the "Final Fused" image is output by step 137 and the "Nuclear Fused" image results from step 130 described above.

Computer Support

Figure 4:
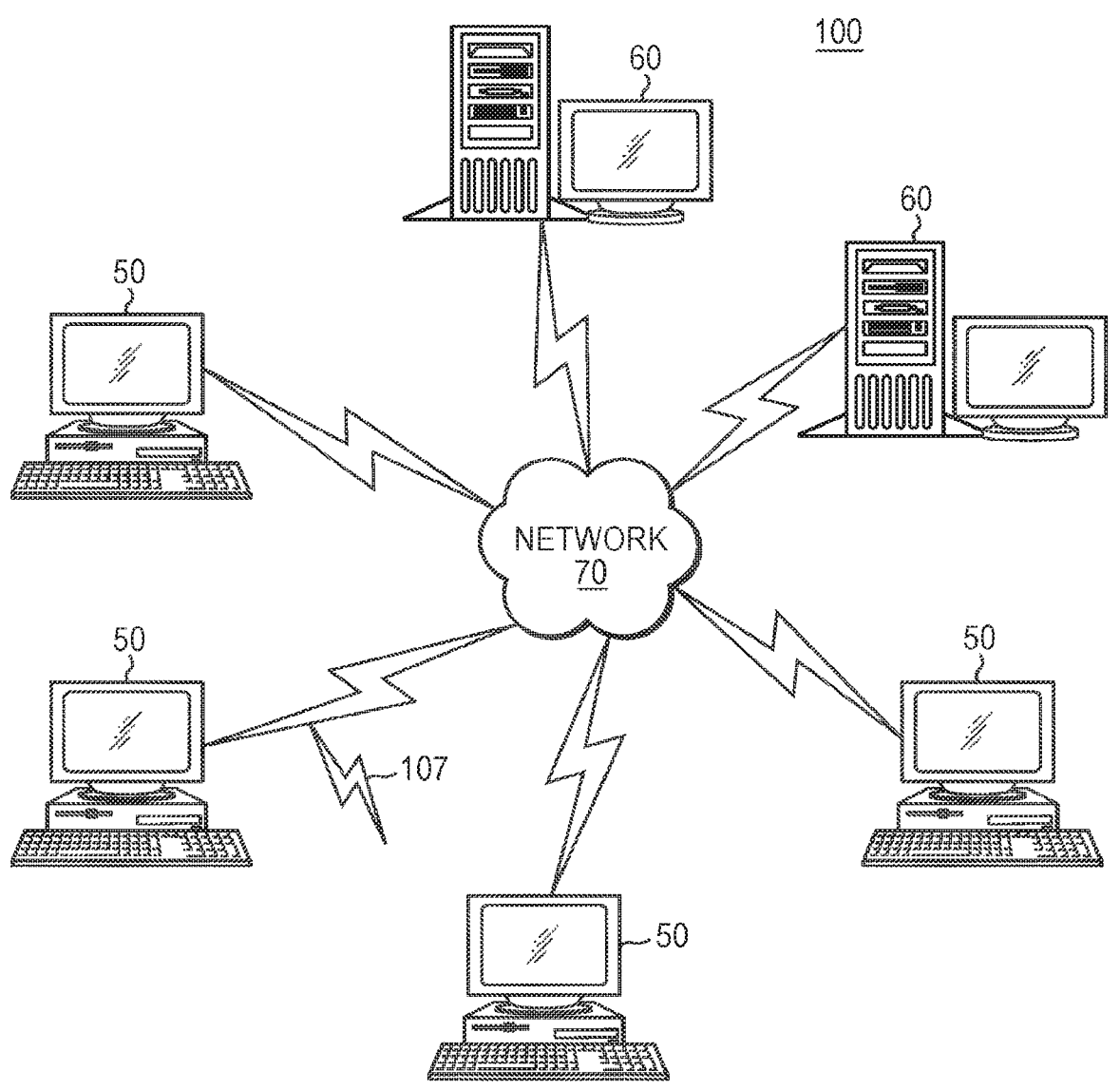
FIG. 4 is a schematic view of a computer network for deploying embodiments.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, a cloud computing environment, Local area or Wide area networks, and gateways that currently use respective protocols (TCP/IP, Bluetooth, etc.) to communicate with one another. Other electronic device/computer network architectures, such as an internet of things, and the like are suitable.

Figure 5:
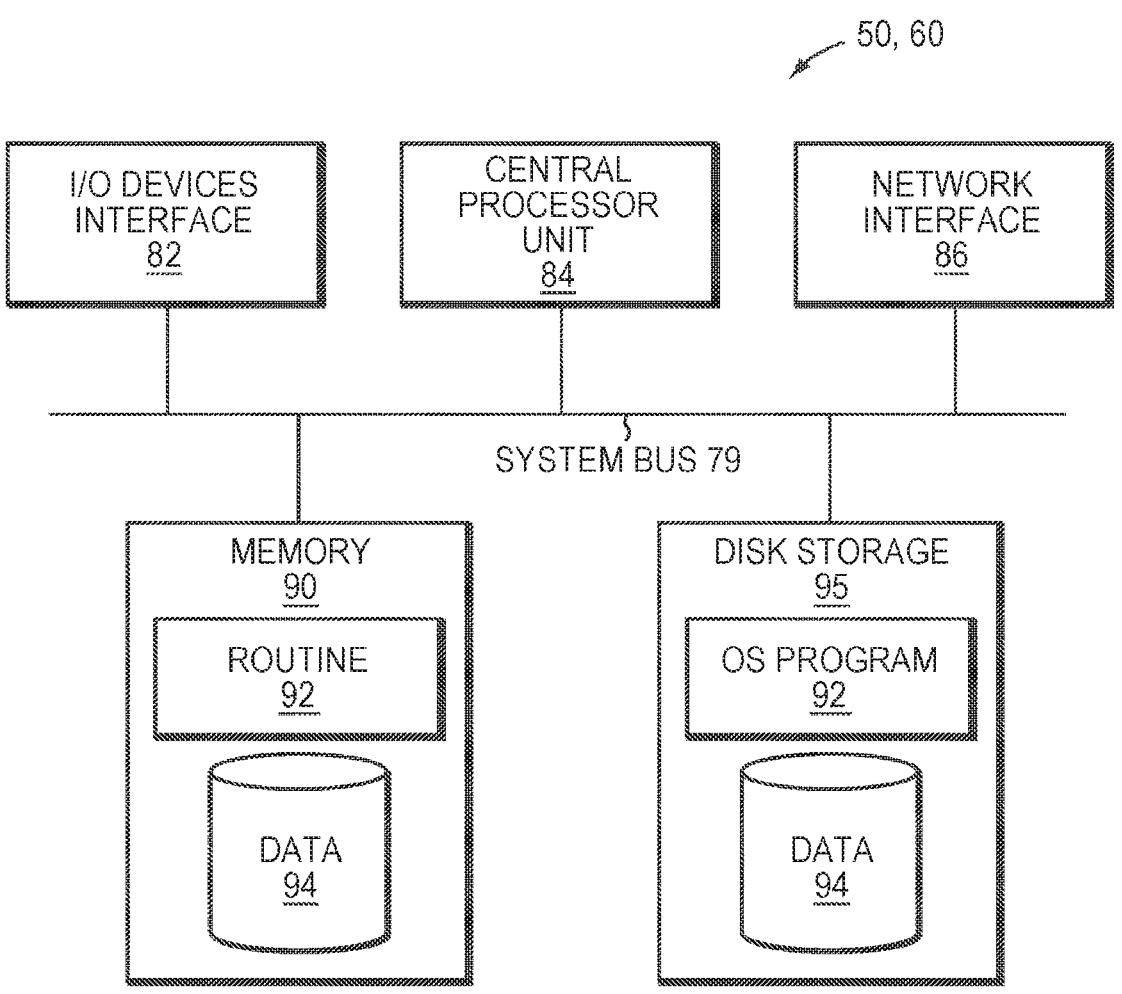
FIG. 5 is a block diagram of a computer node in the FIG. 4 computer network environment.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, source feed or access to acquired images 121, displays, monitors, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., classifier engine 107 code detailed above). Disk storage 95 provides non-volatile storage for computer software instructions 92 and data 94 used to implement an embodiment of the present invention. Central processor unit 84 is also attached to system bus 79 and provides for the execution of computer instructions 92 such as the classifier engine 107 program illustrated in FIG. 2.

The flow of data and processor 84 control is provided for purposes of illustration and not limitation. It is understood that processing may be in parallel, distributed across multiple processors, in different order than shown or otherwise programmed to operate in accordance with the principles of the present invention.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

EXAMPLE

Assessment of sperm morphology is one of the most important steps in the evaluation of sperm quality. A higher percentage of morphologically abnormal sperm is strongly correlated to lower fertility. Morphological image analysis can be used to segment sperm morphology, extract associated quantitative features, and classify normal and abnormal sperms in large quantities. In the majority of human infertility clinics and livestock semen laboratories, brightfield microscopy is used to evaluate sperm morphology. However, since sperm morphology contains a variety of shapes, sizes, positions, and orientations, the accuracy of the analysis can be less than optimal as it is based on a limited number of cells (typically 100-400 cells per sample). To overcome this challenge, we used AMNIS IMAGESTREAM imaging flow cytometer to acquire brightfield, side-scatter and Propidium Iodide (PI) images of boar sperm samples at 60× magnification. We developed novel image algorithms to perform image segmentation and detect abnormal sperm cells using salient shape descriptors (invariant of scale, position, and orientation), such as diameter, circularity, elongation, corners, and negative curvatures. Taking advantage of the ability of the imaging flow cytometer to acquire images at high resolution and speed, we demonstrate the validity of using image based parameters that can be adapted to each spectral image and features to assess sperm morphology with statistical significance in an objective manner.

Materials & Methods

Semen Collection and Processing

Boars (8-26 months old) were used in this study. Semen samples were collected and fixed with 1% formalin. For the live cell analysis, frozen straws stored in liquid nitrogen were thawed at 37 degrees for 30 seconds and labelled with PI for 10 minutes.

Image Acquisition

Sperm samples were run on AMNIS IMAGESTREAM MkII imaging flow cytometer. Around 5,000-10,000 brightfield, side-scatter and Propidium Iodide (PI) events were acquired at 60× magnification at approximately 400 objects per second.

Image Analysis Using IDEAS

Image Analysis was performed using novel Image-based algorithms in the AMNIS IDEAS image analysis software, an embodiment of Applicant's above described system and method involving classifier engine 107.

Results

Identification of Live Cells

PI stain was used to assess the membrane integrity of the sperm to quantify the proportion of live and dead cells in order to select sires with best fertilizing capacity.

Figure 6:
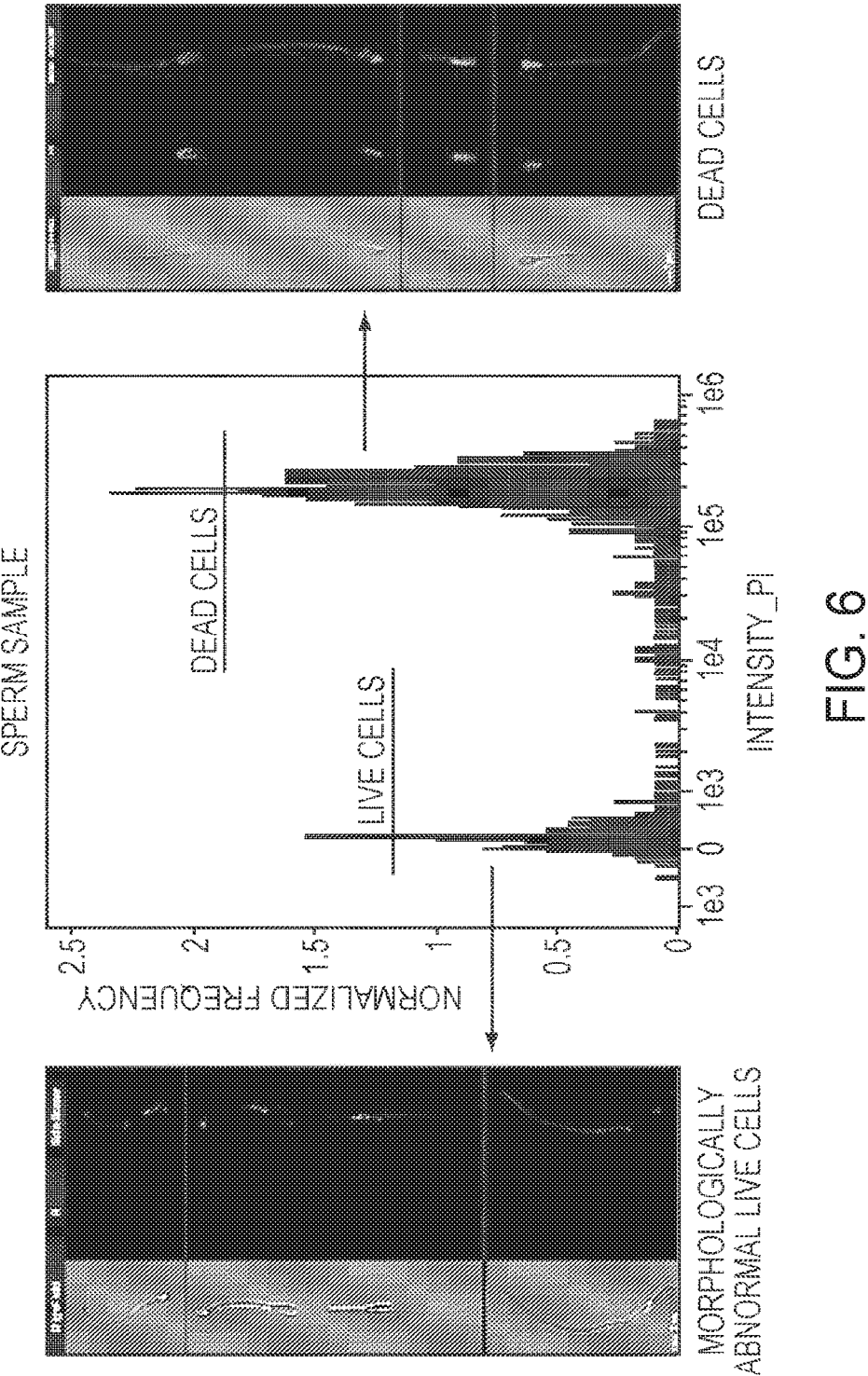
FIG. 6 is a graphical illustration of the PI staining method of live cell identification and quantification.

However, as shown in FIG. 6, PI staining alone was not sufficient to select most suitable sires since the PI negative live cells could have morphological abnormalities which could affect the fertility of the boar.

Once the proportion of live cells was calculated, then sperm morphology was examined using image based morphological features to evaluate the health of the sperm.

Identification of Cytoplasmic Droplets

One of the most common abnormalities in boar semen is the presence of cytoplasmic droplets. Their presence can be a sign of immature sperm or indicate a lack of synchrony between sperm production and semen collection from the boar. In humans, if the proximal droplets are the major site of water influx in hypo-osmotic solutions and if volume regulation during regulatory volume decrease (RVD) can't occur, their size may affect the penetration into female tract. So, identification of the presence of droplets could be of diagnostic importance for infertility.

Figure 7A:
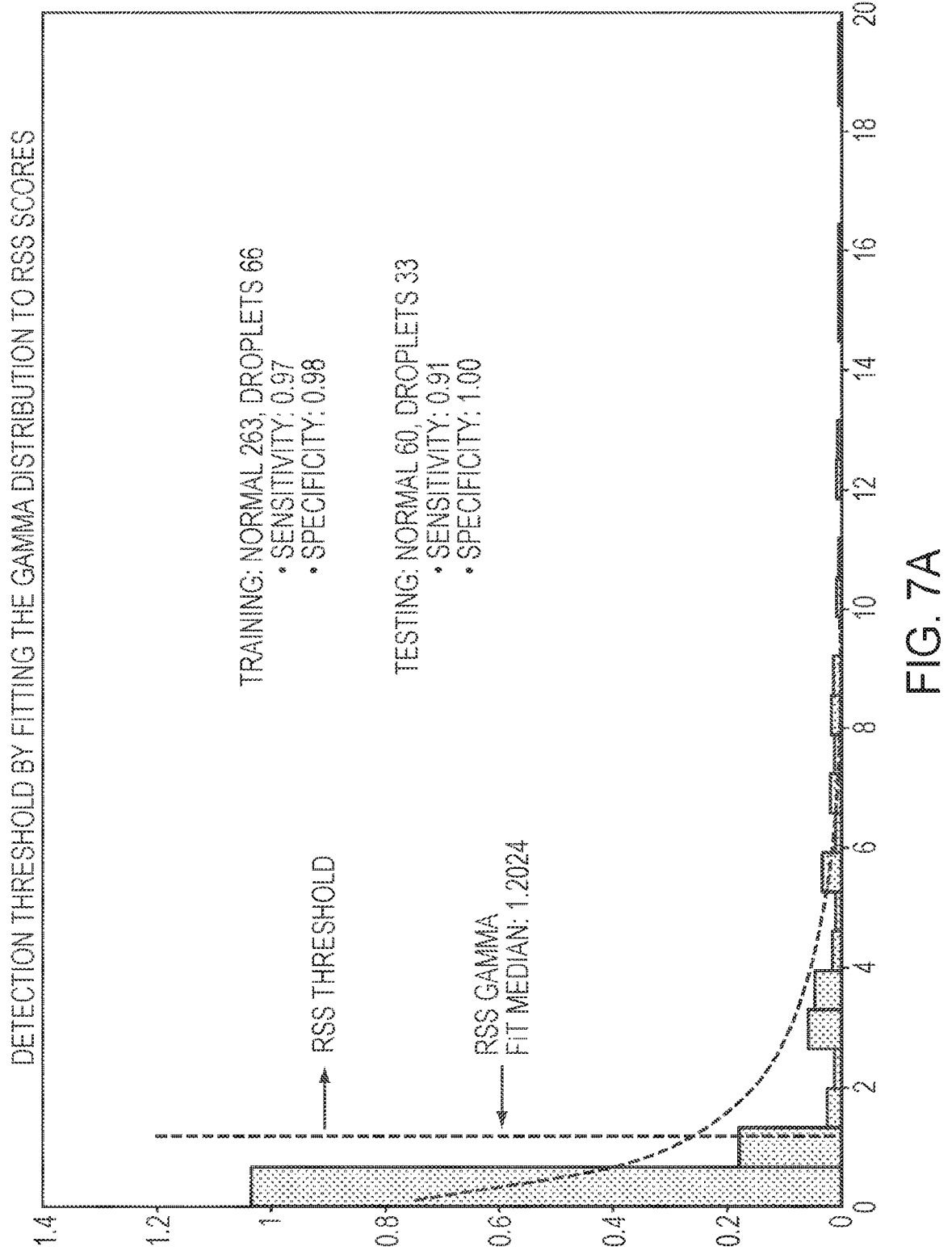
FIGS. 7A and 7B are graphs illustrating droplet detection threshold and sperm droplets detection, respectively, using Radial Symmetry Strength (RSS) scores.
Figure 7B:
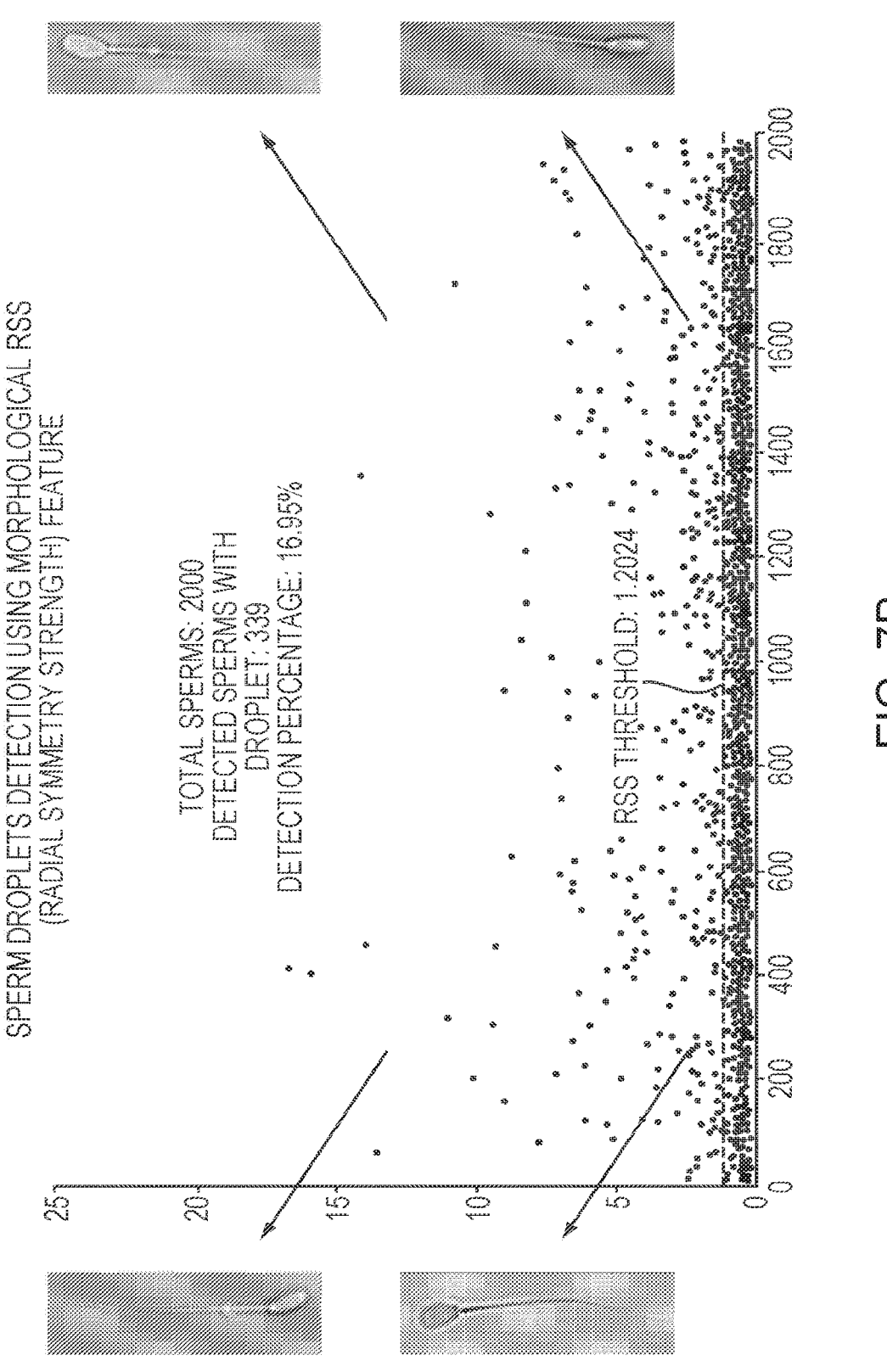

These droplets (both distal and proximal) contribute to approximately 15 percent of the total morphological abnormalities in boar sperm. To extract these cytoplasmic droplets using brightfield morphology, an RSS (Radial Symmetry Strength) score feature was created in IDEAS software (generally an embodiment of 107). The prevalence of droplet correlated directly with the droplet spatial feature extracted from the imaging. FIGS. 7(a) and 7(b) are illustrative where FIG. 7A shows a model to calculate RSS threshold for droplet detection. The gamma distribution of the droplets is fitted to the RSS scores and a detection threshold (the RSS Threshold) results. FIG. 7B graphs sperm by RSS score. For these sperm with RSS scores above the 1.2024 threshold (calculated in FIG. 7A), various cytoplasmic droplets were detected, and droplet spatial features extracted from the subject images. In a sample of 2000 sperms, 339 sperms were detected with cytoplasmic droplets which is a 16.95% detection percentage.

Furthermore, with the spatial position of sperm head and midpiece being located in the above multispectral fusion process, the subpopulation of proximal droplets that is at the vicinity of sperm midpiece and distal droplets which is close to sperm flagellum can be statistically determined, which is a very important differentiation in terms of identifying potential sperm cell abnormality and link to infertility. Thus, in embodiments, the resulting improved image data has increased accuracy of location of cell parts in an image and enables detection of complex cell morphologies in the image.

Identification of Bent Tail and Distal Midpiece Reflex

Abnormalities in the midpiece and tail generally arise with defects in the spermatogenesis. Occurrence of Distal Midpiece Reflex (DMR) or bent tail may result in non-motile or abnormal motility in sperm. Consequently, the presence of such abnormalities is generally associated with subfertility.

Figure 8:
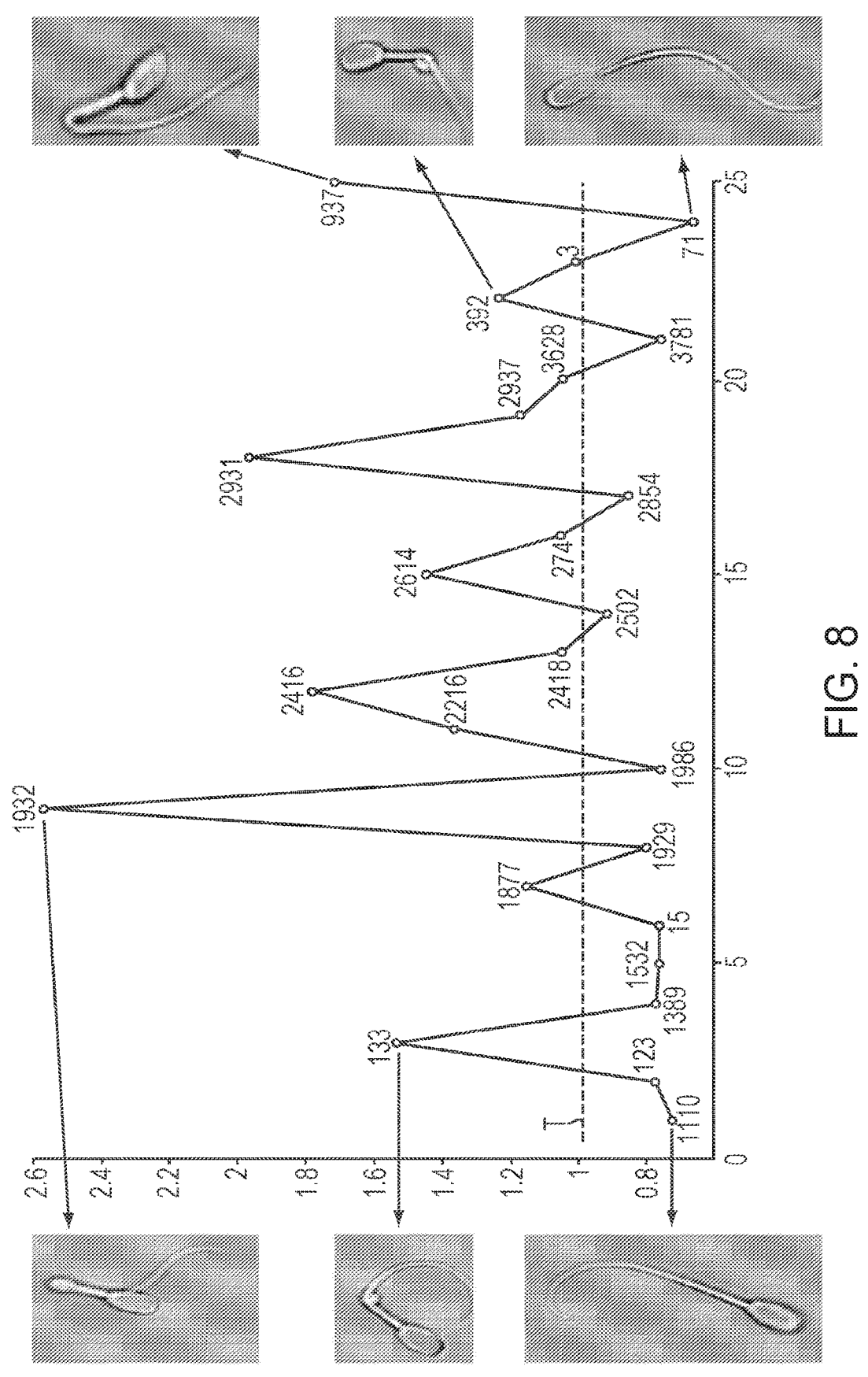
FIG. 8 is a graph of bending scores of sperm cells.

Sperms with bent or curved tails can account for about 10 percent of the total morphological abnormalities in boars. To accurately quantify the number of sperm with DMR or curved tails, a new "bending feature" was developed in IDEAS software embodying classifier engine 107. The bending feature is constructed to directly characterize the bending severity by the curvature maximum (clockwise or counterclockwise) along the sperm skeleton mask. FIG. 8 is a graph of the bending scores of cells. The cell numbers and thresholding line T in FIG. 8 are computed by the mean of the mean, median, and first quartile of the bending scores.

Identification of Sperm Head

Abnormalities in sperm head morphology could impair both fertilization rate and the subsequent embryonic development with failure of cleavage being the primary outcome.

Figure 9A:
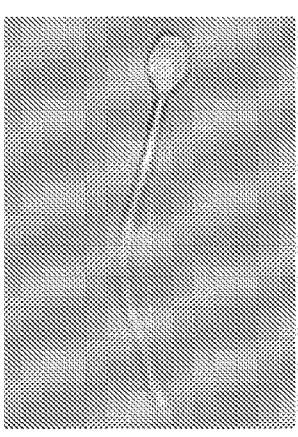
FIGS. 9A-9C are image illustrations of sperm head shapes made detectable by embodiments.
Figure 9B:
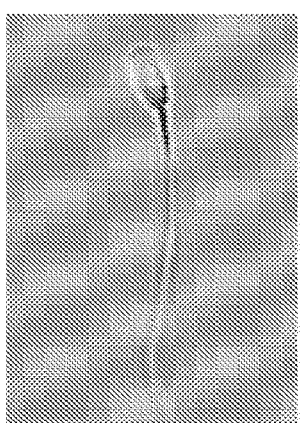
Figure 9C:
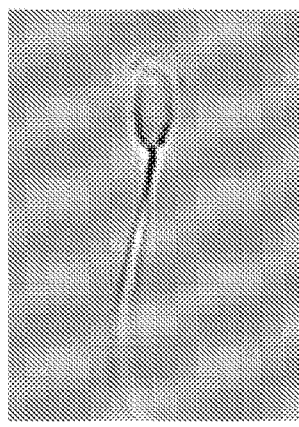

Sperms with abnormal heads account for about 4-5 percent of the total morphological abnormalities in boars. To accurately identify the sperm head, a new shape-based thresholding mask was developed in IDEAS software (embodying classifier 107). FIGS. 9(a)-9(c) show sperm head shapes, the detection of which is enabled by embodiments of the present invention. FIG. 9(a) is an image of a pyriform head shape. FIG. 9(b) is an image of an elongated head shape. FIG. 9(c) is an image of a misshapen head shape. Embodiments produce improved image data having increased accuracy of location of call parts in the image. Using the new mask, contour features were calculated along the head to measure the abnormalities in sperm head.

Statistics

Table 1 summarizes the foregoing morphological features of boar semen made detectable in improved image data by embodiments of Applicant's classifier engine 107 detailed above. In particular, the improved image data of Applicant's system 100 has increased accuracy of location of cell parts in an image and enables detection of complex cell morphologies in the image, such as shown in Table 1.

TABLE 1

Sensitivity and Specificity results for the morphological features

| Feature | Sensitivity | Specificity |
|---|---|---|
| Identification of cytoplasmic droplet | 90 | 100 |
| Identification of bent tail | 85 | 90 |
| Identification of sperm head | 99 | 98 |

CONCLUSION

Studies have shown that there is a direct correlation between the morphology of the sperm and the health of the sperm. Currently a complete analysis of morphology is done by microscopy which can be time consuming and requires a trained staff. Using AMNIS IMAGESTREAM MkII imaging flow cytometer's ability to acquire images at high resolution and speed and the morphological parameters in AMNIS IDEAS software (classifier engine 107), we have successfully demonstrated high specificity and sensitivity in identifying the most prevalent abnormalities in boar semen with minimal use of fluorescent staining.

While this invention has been particularly shown and described with references to example embodiments thereof, it will be understood by those skilled in the art that various changes in form and details may be made therein without departing from the scope of the invention encompassed by the appended claims.

For example, the foregoing discussion uses the brightfield image as the primary working image data improved upon by the Applicant's iterative process of FIG. 2. Other images bearing or representing morphology of cells are suitable instead of the brightfield image.

In another example, in addition to or alternative to sperm cells, other cells such as cancer cells, cells indicative of disease or disorder, sickle cells, and the like may be the subject of embodiments of the present invention. In like manner, diagnostic tools for identifying cell morphology or classifying cell type may embody the foregoing described principles of the present invention.

The embodiment of FIG. 2 employs iterative processing of the multispectral images. Other image processing approaches (parallel processing, distributed processing, etc.) may be employed minding the principles of the present invention to provide relatively fast (near real time) and accurate results (identification of cell morphology and/or classification of cell types).

What is claimed is:

1. A method comprising:

receiving high resolution images of a plurality of moving cells in a stream of a fluid acquired by an imaging flow cytometer, wherein the imaging flow cytometer combines fluorescence sensitivity of standard flow cytometry with spatial resolution and quantitative morphology of digital microscopy, wherein the high resolution images acquired of each of the plurality of moving cells includes a brightfield image, a side scatter image, and a plurality of different fluorescent images respectively associated with a plurality of different spectral bands of fluorescent channels that are spatially aligned to each other;

segmenting the brightfield image of each of the plurality of moving cells into a cellular image and its components by using information from the brightfield image only;

segmenting at least one fluorescent image channel image of the plurality of different fluorescent images to obtain a corresponding cellular image component mask with one or more subcomponent masks; and correlating the one or more subcomponent masks with the cellular image obtained from the brightfield image to form a brightfield mask;

using an analysis framework with statistical modeling to extract salient morphological features from the high resolution images of the plurality of moving cells; and using a classifier engine on the extracted salient morphological features to classify cell types of the plurality of moving cells in the high resolution images.

2. The method of claim 1, further comprising:

using a subcomponent mask of the one or more subcomponent masks as a foreground object seed; and selecting background pixels complimentary to the subcomponent mask of the one or more subcomponent masks.

3. The method of claim 1, further comprising:

prior to the segmenting, specifying a shape model to use for a subcomponent mask.

4. The method of claim 1, further comprising:

reprocessing each brightfield image using the one or more subcomponent masks to form final brightfield images with one or more positioned subcomponent masks.

* * * * *